United States Patent Office 3,514,498
Patented May 26, 1970

3,514,498
ANTISTATIC SYNTHETIC RESIN COMPOSITION CONTAINING A POLYETHER - POLYAMIDE BLOCK COPOLYMER WHEREIN AN IONIC FUNCTIONAL GROUP IS MADE TO COEXIST
Kaoru Okazaki, Yoichi Shimokawa, Asaharu Nakagawa, and Kenji Sugii, Nagoya, Japan, assignors to Toyo Rayon Kabushiki Kaisha, Tokyo, Japan, a corporation of Japan
No Drawing. Filed Oct. 30, 1967, Ser. No. 679,169
Claims priority, application Japan, Nov. 1, 1966, 41/71,715, 41/71,716; Nov. 29, 1966, 41/77,-715, 41/77,716; Jan. 18, 1967, 42/3,074; Jan. 27, 1967, 42/4,994
Int. Cl. C08g 41/04
U.S. Cl. 260—857    3 Claims

ABSTRACT OF THE DISCLOSURE

Frictionally chargeable property of a synthetic resin composition consisting of a polyether-polyamide block copolymer blended with other synthetic resin is remarkably improved by coexistence of ionic functional groups in very small amounts which is achieved by either addition of electrolytes or introduction of ionic functional groups into molecules of said synthetic resin composition.

This synthetic resin composition is used for the preparation of fiber, film and shaped articles, and it is especially useful as one component of a composite fiber.

---

The present invention relates to a synthetic resin composition whose antistatic property is remarkably improved consisting of a polyether-polyamide block copolymer or a polyether-polyamide block copolymer and other melt-spinnable or melt-shapeable synthetic resins mixed therewith and a small amount of an ionic functional group made to coexist in said composition, a process for the preparation of said composition and shaped articles of said composition.

A process for obtaining a synthetic resin composition having an excellent antistatic property by using a polyether-polyamide block copolymer alone or preferably in admixture with other synthetic resins has been proposed by the present inventors.

As a result of extensive studies conducted with a view to further improving said process, the present inventors have found that by making a small amount of an ionic functional group coexist in said synthetic resin, the antistatic effect of said composition advances drastically.

When the process of the present invention is briefly explained, upon shaping a shaped article such as fiber, bristle and film from a polyether-polyamide block copolymer alone or preferably in admixture with other melt-spinnable or melt-shapeable synthetic resins, the process of the present invention comprises adding as a third component an ionic substance or introducing an ionic group to the polyether-polyamide block copolymer or the synthetic resins, thereby making the ionic group coexist, by which an antistatic effect of said shaped article is advanced drastically.

The way of making an ionic group coexist in the process of the present invention is divided into the following three methods:

(A) A method of adding an organic electrolyte to a synthetic resin composition comprising a polyether-polyamide block copolymer as at least one component.
(B) A method of using a polyether-polyamide block copolymer containing in its molecule an ionic group such as sulfonic acid group, phosphoric acid group or a metal salt thereof.
(C) A method of introducing an ionic group mentioned above into a polymer molecule of synthetic resins to be mixed with a polyether-polyamide block copolymer such as, for instance, polyamide, polyester and polyester-polyamide block copolymer.

In the method A, as an additive for advancing the antistatic effect, various organic electrolytes may be cited, above all, a metal salt of an organic compound having at least one acidic group and/or an organic ammonium salt is remarkably effective.

As organic acids, an organic compound having at least one carboxyl group, sulfonic acid group and phosphoric acid group may be cited, further concretely, mono- and di-carboxylic acid and sulfonic acid of higher aliphatic, aromatic hydrocarbons, sulfuric acid and phosphoric acid esters of a higher alcohol, $\omega$-amino acid and its oligomers and their derivatives are used. As to the kind of these metal salts, there is no particular limit, however salts of alkali metals and alkaline earth metals are suitable, above all potassium and sodium salts are most preferable.

As concrete examples of the metal salt, potassium, calcium and sodium stearates, sodium salt of a polycapramide oligomer, sodium p-stearyl-benzoic sulfonate or sodium distearyl phosphate may be cited.

An organic ammonium salt as herein referred to is a quaternary ammonium salt as shown in the following formula, at least one of substituents may not be hydrogen atom, these substituents may be polyethylene oxide and derivatives thereof.

$$\left[ \begin{array}{c} R_1 \\ | \\ R_2-N-R_4 \\ | \\ R_3 \end{array} \right]^+ X^-$$

The adding amount of these organic electrolytes is ordinarily 0.1–5.0% by weight, however, preferably it is suitable to add them in an amount of 0.3–2.0% by weight. Even when the amount exceeding 2.0% by weight is added, the antistatic effect is not advanced greatly, and when the amount exceeds 5.0% by weight, an adverse effect is brought about upon spinning. As to the adding method of such an organic electrolyte, mixing with chips at the time of spinning is most simple, however, it may be added to each component or a specific component at the time of polymerization and this invention is not limited by the adding method.

The so obtained composition may be melt spun under ordinary spinning conditions and drawn under ordinary conditions and said mixture may be used as one component of composite filaments.

In the method B, as a process for synthesizing a polyether-polyamide block copolymer having in its polymer molecule an ionic group such as sulfonic acid group, a metal salt thereof, phosphoric acid and a metal salt thereof, for instance, the following process may be cited.

In a process for synthesizing a polyether-polyamide block copolymer from polyether having at its end at least one amino group or carboxyl group, preferably having at its both ends amino groups or carboxyl groups and a monomer for forming polyamide ordinarily used, for instance, the following compound having a sulfonic acid group or a metal salt thereof is used as a copolymerization component to introduce the sulfonic acid group or a metal salt thereof into the molecule of the polyether-polyamide block copolymer.

Compound (a)

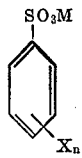

wherein

M: hydrogen or a metal atom
n: 1 or 2
X: COOH, RCOOH, COOR' or RCOOR' (wherein R stands for an alkylene group having 1–5 carbon atoms and R' stands for an alkyl group) in case a group possessed by the polyether is an amino group; or $RNH_2$ or its derivatives (wherein R stands for an alkylene group having 1–5 carbon atoms) in case a group possessed by the polyether is a carboxyl group.

It is general to make molar amount of the carboxyl group or amino group of the compound (a) shown by the above formula same as molar amount of the amino group or carboxyl group of the polyether in using in a state wherein the two form a salt, however, by using the aforementioned compound in an excess or smaller amount, it is possible to control number average molecular weight of the produced polymer. Again it is possible to use said compound together with another dicarboxylic acid or diamine.

As a copolymerization component having an ionic group, besides said compound (a), for instance, the following compounds may be cited.

Compound (b)

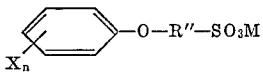

wherein

M, n and X are same as defined in said compound (a),
R'': an alkylene group which may contain an alkylene oxide group in its chain.

Compound (c)

wherein

R: an alkylene or aralkylene group,
M: same as defined in said compound (a).

Compound (d)

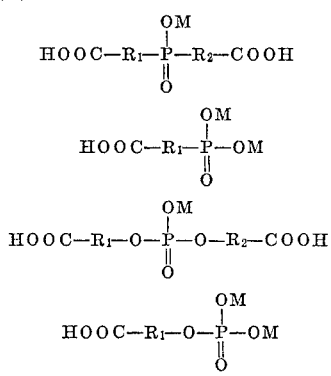

wherein $R_1$, $R_2$: an alkylene or aralkylene group
M: same as defined in said compound (a).

Compound (e)

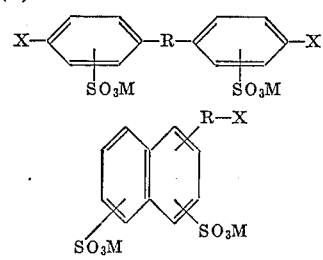

wherein R, X, M: same as mentioned above.

In the method C, as a method for introducing an ionic group such as sulfonic acid group, phosphoric acid group and their metal salts into a polymer molecule of synthetic resins to be mixed with a polyether-polyamide block copolymer, for instance, polyamide, polyester, and a polyester-polyamide block copolymer, it may be carried out similar to the case of said method B, for instance, it may be carried out by copolymerizing said compounds (a), (b), (c) and (d) with another general monomer.

A polyether-polyamide block copolymer as herein referred to is a block copolymer wherein polyamide such as polycapramide and polyhexamethylene adipamide and polyether such as polyethylene oxide are linked in the state of a straight chain, and as a process for synthesizing the same, there are, for instance, the following processes. However, the present invention will not be limited by these synthesizing processes.

(a) A lactam is polymerized in the presence of an organic or inorganic acid salt of polyether having at its end at least one amino group to synthesize a block copolymer wherein polyamide is bonded to the end of polyether.

(b) Polyamide having at its both ends carboxyl (or amino) groups or an oligomer thereof and polyether having at its both ends amino (or carboxyl) groups or an oligmer thereof are condensed in molten states to prepare a block copolymer.

(c) Said monomer for forming polyamide is polycondensed in the presence of polyether having at its end at least a carboxyl group or an organic ammonium salt thereof.

Monomers for forming polyamide as herein referred to are, for example, cyclic lactams such as ε-caprolactam, η-capryllactam and ω-lauryllactam, ω-aminocarboxylic acids such as ε aminocaproic acid and 11-aminoundecanoic acid, and salts of aliphatic or aromatic diamines with dicarboxylic acids such as hexamethylene diammonium adipate, hexamethylene diaminonium sebacate and m-xylylene diammonium adipate, which are used singly or in admixture. It goes without saying that when a mixture is used, a polyamide component of the obtained polyether-polyamide block copolymer has become copolymerized polyamide.

Polyether as herein referred to is polyalkylene oxide such as polyethylene oxide, polypropylene oxide, polybutylene oxide and polytetramethylene oxide and copolymers thereof and may contain a small amount of another copolymerizable component. Of these, polyethylene oxide is the most suitable for the object.

In these block copolymers, a catalyst used for the copolymerization, unreacted polyether and polyamide, and an additive such as a sunlight resisting agent and a heat resisting agent may exist.

As melt-spinnable or melt-shapeable synthetic resins in the process of the present invention, polyamides, polyesters polyester-polyamide block copolymers, polyolefins and polyvinyls may be cited.

A polyether-polyamide block copolymer is melt spun or shaped singly or in admixture with these synthetic resins. Again it is also possible to mix polyether-polyamide block copolymers of different kinds.

Further, it is possible to combine more than two kinds of such copolymer and use the mixture.

Polyamide used in the present invention is an ordinary polyamide obtained from such various lactams, ω-aminocarboxylic acid, various diamines and a dicarboxylic acid as mentioned above and/or a copolymerized polyamide, and, for instance, nylon 6, 66, 12 and 66/6 (66/6 stands for copolymerization) are included. In such polyamide, an ordinary polymerization catalyst used for the polymerization or an additive such as a heat resisting agent and a sunlight resisting agent may remain.

Polyester used in the present invention is an ordinary polyester and/or a copolymerized polyester obtained from a dicarboxylic acid or a derivative thereof and dioxy compound or alkylene oxide, and from an oxycarboxylic acid, and, for instance, polyethylene terephthalate and polyethylene isophthalate may be cited. In such polyester, an ordinary catalyst used for the polymerization or an additive such as a sunlight resisting agent and a heat resisting agent may remain.

A polyester-polyamide block copolymer as herein referred to is a block copolymer of a structure wherein said polyester component and polyamide component are linked in the state of a straight chain, and as a process for the synthesis, there are, for instance, the following processes.

(a) A process of polycondensing in solid phase polyamide having at its both ends amino (or carboxyl) groups (including an oligomer) and polyester having at its both ends carboxyl (or amino) groups (including an oligomer) to make them a polyester-polyamide block copolymer.

(b) A process of polycondensing in a solution polyamide having at its both ends amino or carboxyl groups (including an oligomer) and polyester having at its both ends carboxyl or amino groups (including an oligomer) to make them a polyester-polyamide block copolymer.

(c) A process of polycondensing a mixture of polyamide majority of whose both ends is amino groups and polyester whose both ends consist predominantly of hydroxyl groups by heating in solid phase under a reduced pressure and distilling off diol.

And in such a polyester-polyamide block copolymer, a copolymerization catalyst used for the copolymerization, unreacted polyester and polyamide and an additive such as a sunlight resisting agent and a heat resisting agent may be included.

As polyolefin, polyethylene and polypropylene may be cited wherein the polymerization catalyst and an additive such as a sunlight resisting agent and a heat resisting agent may be included.

The process of the present invention will not be particularly limited to a process for synthesizing a polyether-polyamide block copolymer including said ionic group, a process for synthesizing a polyester-polyamide block copolymer or kinds of polymer such as polyamide, polyester and polyolefin.

As to the length of a polyether segment in a polyether-polyamide block copolymer used in the process of the present invention, there is no particular limit, however, the average number of alkylene oxide recurring units in each polyether segment of polyether-polyamide block copolymer is usually 20–180, preferably 45–130.

In order to raise the antistatic effect, it is effective to blend a small amount of a polyether-polyamide block copolymer whose content of a polyether component is relatively large with the synthetic resins. It is proper to use a polyether-polyamide block copolymer in which the content of a polyether component is within the range of 15–85% by weight, preferably 20–60% by weight. Mixing ratio of a polyether-polyamide block copolymer differs depending upon the kind of polyether-polyamide block copolymer and the object of the obtained product, however, ordinarily a ratio so as to make the content of a polyether component in the mixture 0.1–20% by weight, preferably 0.1–10% by weight, further preferably 0.3–5% by weight is used.

As a process for mixing a polyether-polyamide block copolymer with synthetic resins such as polyamide, polyester, polyester-polyamide block copolymer and polyolefin, the following processes may be cited.

(i) A process of well mixing chips of the two polymers and feeding this mixed chips to an ordinary melt spinning or shaping machine.

(ii) A process of melting singly each of the two polymers and mixing the two in a molten state.

(iii) A process of melt mixing the two polymers by an ordinary extruder to make them chips and using the same.

The period during which a polyether-polyamide block copolymer is mixed with polyamide or polyester in a molten state is preferably so short as hardly causing any chemical reaction therebetween, for instance, amide exchange reaction and ester amide exchange reaction. When the period is made long, an amide exchange reaction or an ester amide exchange reaction proceeds sufficiently with a result that there is substantially hardly any difference from the case of using a polyether-polyamide block copolymer, the content of whose polyether segment is low.

The amount of an ionic functional group to be made to coexist with said composition is ordinarily $2.0 \times 10^{-6}$ mol/g.–$1.0 \times 10^{-4}$ mol/g., however, generally it is proper to add said group in an amount of $5.0 \times 10^{-6}$ mol/g.–$5.0 \times 10^{-5}$ mol/g. Even when an amount exceeding $5.0 \times 10^{-5}$ mol/g. is added, the antistatic effect is not increased greatly and when the amount exceeds $1.0 \times 10^{-4}$ mol/g., sometimes it results in adversely affecting the spinning of said composition on the contrary. Again, with an amount below $2.0 \times 10^{-6}$ mol/g., the expectable effect is not sufficient.

In the method A (method of adding an organic or inorganic electrolyte), it is most simple to mix an electrolyte to be added with chips at the time of spinning, however, it may be added to each or a specific component at the time of polymerization and the adding is not limited by an adding method.

In the method B or C, a polyether-polyamide block copolymer having an ionic group is mixed with other synthetic resins or synthetic resins having ionic groups are mixed with a polyether-polyamide block copolymer and as to the mixing process, it is as mentioned above.

When three methods of A, B and C are compared, the method B is most excellent.

The method A also exhibits an excellent effect to some extent, however, in said method an electrolyte mixed with the polymer tends to be extracted and removed with water or other general solvents and sometimes said method shows an inclination of gradually losing the effect.

This effect of advancement of the antistatic properties is due to making a small amount of an ionic component coexist besides a polyether-polyamide block copolymer, and the effect is either remarkable improvement in the antistatic properties as compared with a case wherein no ionic component is made to exist or in case the same antistatic properties are imparted, the content of a polyether portion will do in a small amount, and it is apparent that making said group coexist is advantageous in terms of fiber characteristics and cost.

Such effect due to making an ionic component coexist is not a total adding the effect of the two, but remarkably increases as compared with a case wherein each of the two is singly used and synergistic effect of the two is apparent.

Such a composition is not only applied to fiber, bristle and shaped article consisting of the same only, but also it is used in a composite state with another composition, for instance, as one component of core-sheath or side-by-side composite filaments. The composition of the present invention will not be limited by shape of filaments or shaped articles.

Now the present invention will be explained with reference to examples, however, it should be noted that the present invention will not be limited by these examples.

EXAMPLE 1

Polyethylene glycol was reacted with acrylonitrile in the presence of an alkaline catalyst, and the resultant cyanoethylated polyethylene glycol was hydrogenated to synthesize diamine of polyethylene oxide at least 95% of whose both ends was amino group. The number average molecular weight was 4500. With said diamine adipic acid was reacted to form a salt, which salt was mixed with ε-caprolactam, and the mixture was polymerized to synthesize a polyether-polyamide block copolymer. The polymerization was carried out by heating at 240° C. for 12 hours in a nitrogen gas under the atmospheric pressure. After the produced polymer was extracted with hot water by a usual manner to remove the unreacted parts, said polymer was dried under a reduced pressure.

The content of a polyether component of the obtained polyether-polyamide block copolymer was 45% by weight. Relative viscosity of a m-cresol solution of this polymer was 2.42.

On the other hand, poly-ε-capramide, relative viscosity of 98% sulfuric acid solution thereof being 2.40, was prepared. These two kinds of polymers were mixed at a ratio of the polyether-polyamide block copolymer to poly-ε-capramide of 1:24, the mixture was melt spun according to the conventional process, the filaments were drawn 3.6× to prepare 70 denier/24-filament multifilaments.

The average content of a polyether component in the obtained fiber was about 1.8% by weight.

As the blend melt spinning as mentioned above, the following additives were added at various ratios and the effects thereof were compared. As shown in the Table 1, by adding a very small amount of an organic electrolyte, the antistatic effect was improved remarkably.

(A)   $C_{17}H_{35}COONa$ (B) 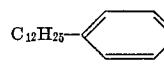

(B) Relative viscosity of a sulfuric acid solution: Relative viscosity was measured at 25° C. with reference to the solution wherein 1 g. of the polymer was dissolved in 100 cc. of 98% concentrated sulfuric acid.

EXAMPLE 2

Polyamide shown by a molecular formula,

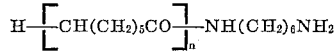

(average value of $n$ being 26), obtained by adding hexamethylene diamine to ε-caprolactam and polymerizing the mixture was mixed in the molten state with what had a molecular formula,

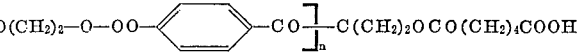

(average value of $n$ being 17.5), obtained by reacting polyethylene terephthalate with an acid chloride of adipic acid, thereafter treating the reaction mixture with water, so that the carboxyl terminal group and the amino terminal group might become equimolar, and the mixture was polymerized in solid phase at 180° C. under a reduced pressure of 3 mm. Hg for 8 hours to obtain a polyester-polyamide block copolymer. On the other hand, polyethylene glycol having a number average molecular

TABLE 1

| Kind | Additive Amount Weight percent | Additive Amount Mol./g. | Antistatic effect Frictionally charged voltage (V.) | Antistatic effect Specific resistance (Ω. cm.) | Mechanical properties Tenacity (g./d.) | Mechanical properties Elongation percent | Mechanical properties Initial modulus percent |
|---|---|---|---|---|---|---|---|
| None | 0 | 0 | 610 | 2.0×10⁸ | 4.8 | 39.5 | 27.8 |
| A | 0.03 | 1.0×10⁻⁶ | 600 | 1.2×10⁸ | 4.9 | 38.5 | 26.7 |
|   | 0.06 | 2.0×10⁻⁶ | 510 | 4.2×10⁷ | 4.7 | 40.0 | 28.1 |
|   | 0.61 | 2.0×10⁻⁵ | 250 | 1.8×10⁷ | 4.8 | 39.0 | 27.5 |
|   | 3.05 | 1.0×10⁻⁴ | 190 | 1.1×10⁷ | 4.4 | 38.5 | 24.2 |
|   | 4.57 | 1.5×10⁻⁴ | 180 | 1.1×10⁷ | 3.8 | 39.0 | 20.1 |
| B | 0.035 | 1.0×10⁻⁶ | 570 | 9.8×10⁷ | 4.7 | 39.0 | 28.8 |
|   | 0.070 | 2.0×10⁻⁶ | 480 | 2.3×10⁷ | 4.8 | 38.5 | 27.2 |
|   | 0.70 | 2.0×10⁻⁵ | 140 | 9.5×10⁶ | 4.7 | 38.5 | 27.8 |
|   | 3.50 | 1.0×10⁻⁴ | 110 | 8.3×10⁶ | 4.3 | 38.0 | 23.5 |
|   | 5.25 | 1.5×10⁻⁴ | 120 | 8.7×10⁶ | 3.5 | 38.5 | 19.5 |

As will be apparent from Table 1, when the amount of an ionic functional group was less than $2.0×10^{-6}$ mol/g., there was hardly any substantial effect, and when the amount became not less than $2.0×10^{-6}$ mol/g., an effect appeared for the first time. An amount within the range of $5.0×10^{-6}$ mol/g. to $5×10^{-5}$ mol/g. was most desirable. Even when the amount became more than $5×10^{-5}$ mol/g., the effect did not improve remarkably, and when the amount became more than $1.0×10^{-4}$ mol/g., *yarn-spinnability* became poor and other fiber characteristics (tenacity and initial modulus) were adversely affected.

Annotation of Table 1

(1) Frictionally charged voltage: Using a rotary static tester, when knitted goods prepared from these fibers were rubbed by a polyethylene terphthalate film, static voltage charged with the knitted goods was measured at 20° C. and 65% RH.

(2) Specific resistance: The fibers were bundled and electric resistances at the both ends were measured at 20° C. and 65% RH and specific resistances were calculated.

In cases of Example 2 and onward, the same process was applied.

Methods of measuring solution viscosity (A) Relative viscosity of a m-cresol solution: Relative viscosity was measured at 25° C. with reference to the solution wherein 1 g. of the polymer was dissolved in 100 cc. of m-cresol.

weight of about 2000 was cyanoethylated and hydrogenated to synthesize diamine of polyethylene oxide of a structure having amino groups at its both ends, with which an equimolar amount of adipic acid was reacted to form a diamine salt, with which salt anhydrous ε-caprolactam was mixed so that content of a polyethylene oxide portion might become 24% by weight, the mixture being heated at 240° C. in a nitrogen atmosphere for 20 hours to obtain a polyether-polyamide block copolymer. The so obtained polyether-polyamide block copolymer chips, polyester-polyamide block copolymer chips, polyhexamethylene adipamide chips and polyethylene terephthalate chips were mixed at a weight ratio of 1:1:1:1 by a blender. To this mixture 0.5% by weight of the following organic electrolytes were added, and the resultant mixtures were melt spun at a spinning temperature of 290° C. and a winding speed of 600 m./min., further, the filaments were drawn 3.9× to obtain drawn filaments. Characteristics of the so obtained drawn filaments were shown in Table 2.

(A) Potassium stearate (B) Sodium salt of a polycapramide oligomer ($NaOOC(CH_2)_4CO[NH(CH_2)_5CO]_nNa$ ($\bar{n}=11$))

(C) 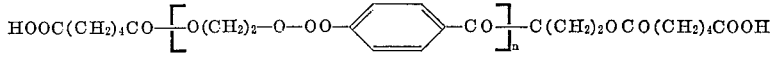

(D) 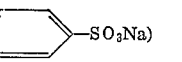

TABLE 2

| Organic electrolyte | Adding ratio (wt. percent) | Frictionally charged voltage (V.) | Specific resistance (Ω cm.) |
| --- | --- | --- | --- |
| None | 0 | 850 | $8.1 \times 10^8$ |
| A | 0.5 | 95 | $9.2 \times 10^6$ |
| B | 0.5 | 100 | $9.4 \times 10^6$ |
| C | 0.5 | 120 | $9.7 \times 10^6$ |
| D | 0.5 | 135 | $9.9 \times 10^6$ |

EXAMPLE 3

A polyether-polyamide block copolymer obtained by the same process as in example 2 was mixed with polyethylene terephthalate at ratios of 1:5, 1:3 and 1:2, and the mixtures were melt spun and drawn to obtain filaments having fiber characteristics as shown in Table 3. Contents of polyether portions in the filaments were 4, 6 and 8% by weight, respectively.

On the other hand, adding 0.5% by weight of sodium stearate, potassium stearate and calcium stearate, block polyether amide and polyethylene terephthalate were mixed and melt spun as mentioned above.

By way of comparison, fiber characteristics of what was obtained by melt spinning polyethylene terephthalate blended with the aforementioned metal salts of stearic acid only were also measured.

By adding metal salts of stearic acid to the polyether-polyamide block copolymer, the antistatic effect was improved remarkedly and the synergistic effect of the existence of both the polyether component and the metal was very remarkable.

TABLE 3

| Composition | | | | |
| --- | --- | --- | --- | --- |
| Content of PEO component (wt. percent) | Kind | Adding ratio (wt. percent) | Frictionally charged voltage (V.) | Dye absorption (percent) |
| 0 | None | 0 | 3,850 | 21.5 |
|   | Na salt | 0.5 | 3,250 |   |
|   | K salt | 0.5 | 3,030 |   |
|   | Ca salt | 0.5 | 3,480 |   |
| 4 | None | 0 | 1,450 | 37.5 |
|   | Na salt | 0.5 | 650 |   |
| 6 | None | 0 | 1,090 | 43.0 |
|   | Na salt | 0.5 | 185 |   |
|   | K salt | 0.5 | 165 |   |
|   | Ca salt | 0.5 | 420 |   |
| 8 | None | 0 | 710 | 52.8 |
|   | Na salt | 0.5 | 170 |   |

Dye absorption was measured by the following method.

Dye absorption: Using as a dye liquor a 2% solution of a disperse dye (Resoline Blue PBL) with addition of Scourol as a dyeing assistant, dyeing was effected at 95° C. for 45 minutes. Concentrations of the dye liquor before and after dyeing were measured by a photoelectric colorimeter and a dye absorption was calculated from the following equation.

$$\text{Dye absorption (percent)} = \frac{A_0 - A_1}{A_0} \times 100$$

$A_0$: Extinction of the dye liquor before dyeing
$A_1$: Extinction of the dye liquor after dyeing

EXAMPLE 4

By heat polymerizing ε-caprolactam in the presence of a salt consisting of diamine of polyethylene oxide having a number average molecular weight of about 3050 and adipic acid, a polyether-polyamide block copolymer, whose content of a polyethylene oxide component being 8% by weight, was synthesized. Said block copolymer per se alone was melt spun, in that time, 0.3% by weight of the various additives shown in Table 4 was added and the effects were compared.

TABLE 4

| Additive | Frictionally charged voltage (V.) |
| --- | --- |
| $C_{17}H_{35}$—⟨C₆H₄⟩—$SO_3Na$ | 160 |
| $C_9H_{19}$—⟨C₆H₄⟩—$O(CH_2CH_2O)_4SO_3 \cdot \tfrac{1}{2}Mn$ | 430 |
| $(C_{17}H_{35}O)_2P(=O)ONa$ | 210 |
| $(C_{16}H_{33})_2 N^+(CH_3)_2 Cl^-$ | 320 |
| None | 1,050 |

EXAMPLE 5

From one hopper of a composite yarn spinning machine, a polyether-polyamide block copolymer was fed and from the other hopper thereof a polyester-polyamide block copolymer was fed. Melting the polyether-polyamide block copolymer at 250° C. and the polyester-polyamide block copolymer at 280° C., using a composite spinneret, side-by-side type composite filaments at a composite ratio of 1:1 were melt spun.

In this case, 0.5% by weight of potassium stearate was added to the polyether-polyamide block copolymer, 0.5% by weight of potassium stearate was added to the polyester-polyamide block copolymer and another 0.25% by weight of potassium stearate was added to both the polyether-polyamide block copolymer and the polyester-polyamide block copolymer, respectively.

The so obtained undrawn filaments were drawn 3.8× using a hot drawing pin at 80° C. and a plate heated at 150° C. to obtain composite drawn filaments.

Antistatic property, C.R. (compliance ratio), etc. were measured of the drawn filaments and the results were shown in Table 5.

By addition of potassium stearate, the antistatic property greatly was improved and the synergistic effect of the existence of both the polyether component and the metal salt was very remarkable.

TABLE 5

| Potassium stearate | Frictionally charged voltage (V.) | C.R. (g./d.) | Tenacity (g./d.) |
| --- | --- | --- | --- |
| 0 | 895 | 0.31 | 3.9 |
| Added to the polyether-polyamide block copolymer | 93 | 0.31 | 3.8 |
| Added to the polyester-polyamide block copolymer | 488 | 0.31 | 4.0 |
| Added to the two components | 126 | 0.32 | 3.9 |

The polyether-polyamide block copolymer used herein was synthesized as follows.

From diamine of polyethylene oxide shown by a molecular formula, $H_2N \cdot H_2C(CH_2CH_2O)_n CH_2CH_2CH_2NH_2$ (number average molecular weight: about 2000) and adipic acid, a diamine salt was formed.

This diamine salt was mixed with ε-caprolactam so that a polyethylene oxide portion might become 10% by weight and the mixture was heat polymerized at 250° C. in a nitrogen atmosphere for 20 hours.

A process for synthesizing the polyester-polyamide block copolymer was as follows.

Polyamide having a molecular formula,

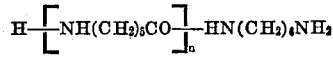

(average value of $n$ being 35) obtained by adding hexamethylene diamine to ε-caprolactam and polymerizing the mixture, and what had a molecular formula,

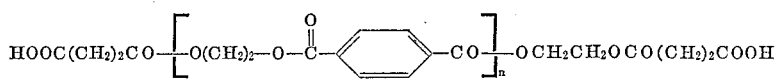

(average value of $n$ being 58) obtained by dissolving polyethylene terephthalate in α-naphthalene and reacting the resultant solution with succinic anhydride to make the end a carboxyl group were so mixed in molten state that molar ratio of terminal amino group to terminal carboxyl group might become precisely 1:1, and the mixture was polymerized in solid phase at 180° C. under a reduced pressure of 3 mm. Hg for 6 hours to obtain a polyester-polyamide block copolymer.

Each of these copolymers themselves was well spinnable.

C.R. in this example was measured by the following method—

C.R.: It was measured of filaments and calculated from the following equation $$C.R. = \frac{10/L_{10} - 5/L_5}{5}$$

$Lx$ was a value expressed by g./d. of a stress at the time of elongation by $x\%$.

EXAMPLE 6

Using as one component of composite filaments polycapramide and as the other component a polyethylene oxide-polycapramide block copolymer obtained by the similar process to that in Example 5 added with various additives, composite undrawn filaments disposed in a core-sheath type were prepared by the process similar to that in Example 5. In this case, to the core nylon 6 was made to come and to the sheath the polyethylene glycol-polycapramide copolymer was made to come and both concentric and eccentric undrawn filaments were prepared. Disposition of the eccentric center was so made as not to expose the core. By hot drawing the undrawn filaments, composite drawn filaments were obtained. The so obtained composite drawn filaments had excellent antistatic effects. The properties of these drawn filaments were shown in Table 6.

By way of comparison, a case of composite filaments consisting of random copolymeric polyamide of ε-caprolactam and hexamethylene diammonium adipate (ratio of nylon 6 to nylon 66 being 85:15), instead of the polyethylene glycol-polycapramide block copolymer, and nylon 6 was concurrently described.

EXAMPLE 7

From one hopper of a composite spinning machine, feeding a polyether-polyamide block copolymer similar to that used in Example 5 and feeding from the other hopper polyethylene terephthalate, using a core-sheath type composite spinneret, composite undrawn filaments wherein polyethylene terephthalate was disposed at the core and the polyether-polyamide block copolymer was disposed at the sheath concentrically and eccentrically were prepared. The composite ratio was 1:1. In this case, to the polyether-polyamide block copolymer the following organic electrolytes in amounts of 0.5% by weight were added.

(A) Sodium stearate
(B) Potassium stearate
(C) 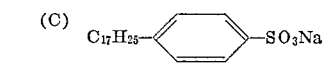
(D) 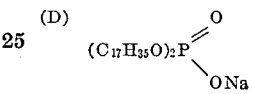
(E) $NaOOC(CH_2)_4CO[NH(CH_2)_5CO]_nONa$   $(\overline{n}=9)$ By drawing 4.2× this undrawn filaments using a drawing pin heated at 110° C. and a plate heated at 130° C., undrawn filaments having overt crimpability were obtained. Because these composite filaments were covered with the polyether-polyamide block copolymer, their antistatic properties were excellent. Characteristics of the drawn filaments were shown in Table 7.

TABLE 7

| Additive | Frictionally charged voltage (V.) | Tenacity (g./d.) | Elongation percent | No. of convolution (No./25 mm.) |
|---|---|---|---|---|
| None (concentric) | 420 | 5.1 | 33.2 | 0 |
| A (concentric) | 54 | 5.2 | 31.5 | 0 |
| A (eccentric) | 58 | 5.2 | 32.1 | 15 |
| B (concentric) | 50 | 5.1 | 31.5 | 0 |
| C (concentric) | 69 | 5.3 | 28.3 | 0 |
| D (concentric) | 75 | 5.0 | 32.1 | 0 |
| E (concentric) | 73 | 5.1 | 31.5 | 0 |

EXAMPLE 8

In the presence of a salt consisting of 1 mol of diamine of polyethylene oxide (number average molecular weight: about 4250) having amino groups at its both ends and 2 mols of monosodium m-sulfobenzoate, ε-caprolactam was heat polymerized to synthesize a polyester-polyamide

TABLE 6.—PROPERTIES OF CORE-SHEATH TYPE DRAWN FILAMENTS

| Polyethylene oxide in a polyethylene oxide-polycapramide block copolymer | | | Composite | | Tenacity (g./d.) | Elongation (percent) | Frictionally charged voltage (V.) | Specific resistance (Ω cm.) |
|---|---|---|---|---|---|---|---|---|
| Number average molecular weight | Content of polyethylene oxide (wt. percent) | Ratio of a metal walt added (wt. percent) | Ratio | Shape | | | | |
| 1,500 | 15.0 | Sodium stearate (1%) | 50:50 | Concentric | 4.8 | 39.8 | 10 | 8.3×10⁵ |
| 1,500 | 15.0 | Sodium salt of nylon 6 oligomer (1%) | 50:50 | do | 4.8 | 42.7 | 35 | 2.1×10⁹ |
| 1,500 | 15.0 | Sodium p-oxyphenylsulfonate (1%) | 50:50 | Eccentric | 4.7 | 41.8 | 35 | 2.0×10⁶ |
| 1,500 | 15.0 | Manganese stearate (2%) | 50:50 | Concentric | 4.5 | 43.0 | 25 | 1.1×10⁶ |
| 6,000 | 15.0 | Phosphoric acid derivative (ᵃ) (1%) | 50:50 | do | 4.3 | 44.4 | 30 | 1.6×10⁶ |
| 6,000 | 23.0 | Ammonium compound (ᵇ) (1%) | 50:50 | Eccentric | 4.2 | 43.9 | 25 | 1.2×10¹⁰ |
| Control sample (ᶜ) nylon 6/66 (85/15) | 0 | | 50:50 | Concentric | 5.6 | 42.0 | 2,940 | 4.3×10¹⁰ |

(ᵃ) 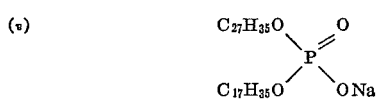

(ᵇ) 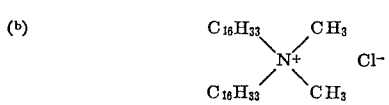

(ᶜ) Caprolactam hexamethylene diammonium adipate 85/15 (weight ratio).

block copolymer whose content of a polyethylene oxide portion was about 4.5% by weight. The mixing ratio and polymerization conditions were as follows:

|  | G. |
|---|---|
| Diamine of polyethylene oxide | 90 |
| Monosodium m-sulfobenzoate | 5 |
| ε-Caprolactam | 1905 |

Polymerization conditions: 257° C., 15 hours, atmospheric pressure, in a nitrogen atmosphere.

Said polymerization product was extracted with hot water to remove the unpolymerized substances, and then was dried under a reduced pressure, thereafter it was melt spun by an ordinary spinning machine. The characteristics of the filaments obtained by cold drawing about 4.0× the resultant filaments were shown in Table 8.

On the other hand, using the same diamine of polyethylene oxide, a salt consisting of the same and adipic acid was copolymerized with ε-caprolactam to synthesize a polyether-polyamide block copolymer whose content of a polyethylene oxide portion was about 4.5% by weight, which was similarly melt spun and drawn. The charac- at the same ratio were also measured. By introducing the Table 8.

By way of comparison, characteristics of filaments of an ordinary nylon 6, and also filaments obtained from a nylon 6 copolymerized with monosodium m-sulfobenzoate alone at the same ratio were also measured. By introducing the sodium sulfonate group to the polyether-polyamide block copolymer, the antistatic effect remarkably was improved and synergistic effect of the existence of both the polyether component and the ionic group was very remarkable.

TABLE 9

| Composition | | Frictionally charged voltage | | | |
|---|---|---|---|---|---|
| Content of PEO component (wt. percent) | Calcium 5-sulfoiso-phthalate | Measured value (V.) | Ratio to nylon 6 | Tenacity (g./d.) | Initial modulus (g./d.) |
| 3 | None | 540 | 0.190 | 6.8 | 33.5 |
| | Being | 85 | 0.030 | 6.7 | 32.0 |
| 5 | None | 320 | 0.112 | 6.6 | 30.5 |
| | Being | 50 | 0.017 | 6.7 | 32.0 |
| 8 | None | 160 | 0.056 | 6.4 | 28.5 |
| | Being | 15 | 0.005 | 6.4 | 29.0 |

EXAMPLE 10

A salt consisting of equimolar amounts of diamine of polyethylene oxide having a number average molecular weight of 5800 and sodium 5-sulfoisophthalate was mixed with ε-caprolactam, and the mixture was heat polymerized to synthesize a polyether-polyamide block copolymer whose content of a polyethylene oxide portion was 60% by weight. The polymerization conditions were same as the case of Example 1.

Said block copolymer was mixed with nylon 12 homopolymer at various ratios so that content of polyethylene

TABLE 8.—COMPARISON OF FIBER CHARACTERISTICS

| Composition | | Frictionally charged voltage | | | | |
|---|---|---|---|---|---|---|
| Content of PEO component (wt. percent) | Copolymerization ratio of monosodium m-sulfobenzoate (wt. percent) | Measured value (V.) | Ratio to nylon 6 | Specific resistance (Ω cm.) | Tenacity (g./d.) | Initial modulus (g./d.) |
| 0 | 0 | 2,850 | 1.000 | 4.3×10¹⁰ | 6.7 | 36.5 |
| 0 | 0.25 | 2,200 | 0.772 | 1.0×10¹⁰ | 6.5 | 37.5 |
| 4.5 | 0 | 1,300 | 0.456 | 9.5×10⁸ | 6.6 | 31.5 |
| 4.5 | 0.25 | 105 | 0.037 | 8.2×10⁶ | 6.6 | 33.0 |

EXAMPLE 9

A salt consisting of equimolar amounts of diamine of polyethylene oxide having a number average molecular weight of about 4500 and calcium 5-sulfoisophthalate having the formula

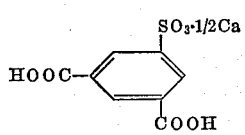

was mixed with ε-caprolactam, and the mixture was heat polymerized to synthesize a polyether-polyamide block copolymer having content of a polyethylene oxide portion of 30% by weight. The polymerization conditions were same as in the case of Example 1.

On the other hand, a salt consisting of equimolar amounts of diamine of polyethylene oxide having a number average molecular weight of about 4500 and adipic acid was mixed with ε-caprolactam and by the similiar process, a polyether-polyamide block copolymer content of whose polyethylene oxide portion being 30% by weight was synthesized.

These two kinds of block copolymer were mixed with nylon 6 homopolymer at various ratios so that contents of polyethylene oxide components might become 3, 5 and 8% by weight, the mixture was melt spun and drawn.

It was apparent that due to synergistic effect of calcium sulfonate and polyethylene oxide segment, very excellent antistatic properties were exhibited.

oxide components might become 0.5, 1.0 and 2.0% by weight, respectively, and the mixtures were melt spun and drawn.

The specific resistances of these monofilaments were as shown in Table 10. Due to synergistic effect of a sodium sulfonate group and a polyethylene oxide segment, very excellent antistatic properties were exhibited.

TABLE 10

| Mixing ratio of polyether-polyamide block copolymer to nylon 12 | Content of polyether in the filaments (wt. percent) | Specific resistance (Ω cm.) |
|---|---|---|
| 0:100 | 0 | 1.2×10¹¹ |
| 1:119 | 0.5 | 7.2×10⁷ |
| 1:59 | 1.0 | 2.1×10⁷ |
| 1:29 | 2.0 | 0.6×10⁷ |

EXAMPLE 11

A salt consisting of equimolar amounts of diamine of polyethylene oxide having a number average molecular weight of about 1950 and adipic acid was mixed with hexamethylene diammonium adipate to synthesize a polyether-polyamide block copolymer whose content of a polyethylene oxide portion was about 50% by weight.

On the other hand, hexamethylene diammonium adipate was polymerized with addition of 0.3% by weight of diamine of the following formula to synthesize a nylon 66 homopolymer having in its polymer molecule potassium sulfonate group.

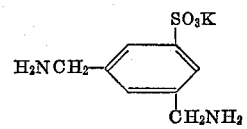

The two were mixed at a ratio of 6:94 so that an average composition of a polyethylene oxide portion might become 3% by weight, the mixture was melt spun and the electrostatic characteristics of the filaments were measured. With reference to what was obtained by mixing said polyether-polyamide block copolymer with an ordinary nylon 66 homopolymer so that content of a polyethylene oxide component might become 3% by weight, and melt spinning the mixture, frictionally charged voltage was measured and the antistact effects of the two were compared.

Frictionally charged voltage
Case of using a nylon 66 copolymerized with potassium 3,5-diamino methylbenzene sulfonate _____ 120
Case of using an ordinary nylon 66 _____ 800

EXAMPLE 12

A salt consisting of polyether having carboxyl groups at its both ends (number average molecular weight: about 4050) derived from copolymeric polyether of ethylene oxide and propylene oxide (copolymerization ratio being 2:1) and hexamethylene diamine was copolymerized with hexamethylene diammonium sebacate to obtain a polyether-polyamide block copolymer whose content of a polyether component was about 45% by weight. On the other hand hexamethylene diammonium sebacate was polymerized with addition of 0.5% by weight of manganese m-sulfobenzoate to synthesize a nylon 6, 10 having in its polymer molecule sulfonic acid group introduced. Fiber, monofilaments or shaped article obtained by melt blending the two was excellent in electrostatic characteristics. With reference to films of an ordinary nylon 6, 10 and the nylon 6, 10 of this example, frictionally charged voltages were measured.

Frictionally charged voltage
Nylon 6, 10 _____ 3500
The sample of this example (blended so that a polyether content might become 4.5% by weight) __ 150

EXAMPLE 12

A salt consisting of equimolar amounts of diamine of polyethylene oxide having amino groups at its both ends (number average molecular weight: about 4250) and calcium 5-sulfoisophthalate of the formula

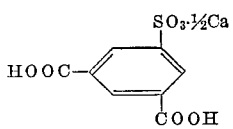

was mixed with ε-caprolactam, and the mixture was polymerized to synthesize a polyether-polyamide block copolymer whose content of a polymerethylene oxide was 30% by weight. The mixture ratio and polymerization conditions were as follows.

(a) Mixing ratio                                G.
Diamine of polyethylene oxide _____ 600
Calcium 5-sulfoisophthalate _____ 37.4
ε-Caprolactam _____ 1362.6

(b) Polymerization conditions

At 257° C. under atmosphereic pressure in a nitrogen atmosphere, said polymerization product was extracted with hot water for 15 hours to remove the unpolymerised parts and was dried under a reduced pressure.

On the other hand, a salt consisting of equimolar amounts of diamine of polyethylene oxide having a number average molecular weight of about 4250 and adipic acid was mixed with ε-caprolactam and by the similar process, a polyether-polyamide block copolymer whose content of a polyethylene oxide portion being 30% by weight was synthesized.

These two kinds of polyether-polyamide block copolymer were mixed with polyethylene terephthalate at various ratios so that contents of polyethylene oxide portions might become 3, 5 and 8% by weight, respectively, the mixtures were melt spun and drawn. The results were shown in Table 11. It was apparent that due to synergistic effect of a calcium sulfonate group and a polyethylene oxide segment, very excellent antistatic effects were exhibited. These effects hardly change after washing for 10 times.

TABLE 11

| Kind of a blend polymer | Composition of fiber | | Frictionally charged voltage (V.) |
|---|---|---|---|
| | Content of PEO component (wt. percent) | Content of calcium 5-sulfoisophthalic acid (wt. percent) | |
| (I)+(II) | 3 | 0.2 | 500 |
| | 5 | 0.3 | 320 |
| | 8 | 0.5 | 150 |
| (I)+(III) | 3 | 0 | 1,800 |
| | 5 | 0 | 1,250 |
| | 8 | 0 | 700 |
| (I) only | 0 | 0 | 3,850 |

NOTE.—(I)=Polyethylene terephthalate; (II)=A polyether-polyamide block copolymer using calcium 5-sulfoisophthalate; (III)=A polyether-polymide block copolymer using adipic acid.

EXAMPLE 14

A salt consisting of equimolar amounts of diamine off polyethylene oxide having a number average molecular weight of about 2150 and sodium 5-sulfoisophthalate and a salt consisting of equimolar amounts of said diamine and adipic acid were synthesized. Each of these salts was mixed with ε-caprolactam, and the mixtures were heat polymerized to synthesize total 4 kinds of polyether-polyamide block copolymer whose contents of polyethylene oxide portion being 10 and 45% by weight. The polymerization conditions, extraction and drying methods were same as the case of Example 13. These 4 kinds of polyetherpolyamide block copolymer were mixed with polyethylene terephthalate so that contents of polyethylene oxide might become 5% by weight, and the mixtures were melt spun and drawn. As a result fibers having electrostatic characteristics as shown in Table 12 were obtained.

TABLE 12

| Kind of blend polymer | Content in the fiber | | Frictionally charged voltage (V.) |
|---|---|---|---|
| | PEO component (wt. percent) | Sodium 5-sulfoisophthalate component (wt. percent) | |
| (I)+(II) | 5.0 | 0.6 | 240 |
| (I)+(III) | 5.0 | 0.6 | 450 |
| (I)+(IV) | 5.0 | 0 | 1,100 |
| (I)+(V) | 5.0 | 0 | 1,900 |
| (I) only | 0 | 0 | 4,050 |

NOTE.—(I)=Polyethylene terephthalate; (II)=A polyether-polyamide block copolymer from sodium 5-sulfoisophthalate, PEO content: 45%; (III)=A polyether-polyamide block copolymer from sodium 5-sulfoisophthalate, PEO content: 10%; (IV)=A polyether-polyamide block copolymer from an adipate, PEO content: 45%; (V)=A polyether-polyamide block copolymer from an adipate, PEO content: 10%.

EXAMPLE 15

A salt consisting of 1 mol of diamine of polyethylene oxide having a number average molecular weight of about 7900 and 2 mols of potassium m-sulfobenzoate of the formula

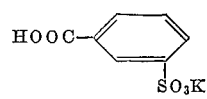

was mixed with ε-caprolactam, and the mixture was heat polymerized to synthesize a polyether-polyamide block copolymer whose content of a polyethylene oxide portion was 15% by weight. Said copolymer was mixed with polyethylene terephthalate, and the mixture was melt spun and drawn, and the electrostatic characteristics of the drawn filaments were as follows.

Percent by weight
Ratio of a polyethylene oxide component in the fiber _____ 2.0
Ratio of a potassium m-sulfobenzoate in the fiber __ 0.12

Frictionally charged voltage, 240 v.

EXAMPLE 16

A salt consisting of equimolar amounts of diamine of polyethylene oxide having a number average molecular weight of about 4250 and manganese 5-sulfoisophthalate was mixed with hexamethylene diammonium adipate at the following ratio, and the mixture was melted and polycondensed by the conventional process.

Percent by weight
Salt of diamine of polyethylene oxide and manganese 5-sulfoisophthalate _____ 37
Hemamethylene diammonium adipate _____ 63

This polymer was mixed with polyethylene terephthalate at ratio of 1:9, and the mixture was melt spun. Fiber whose antistatic effect being excellent was obtained.

Frictionally charged voltage: 650 v.

EXAMPLE 17

With diamine of polyethylene oxide having a number average molecular weight of about 3500, a dicarboxylic acid having the following structure was reacted to thereby obtain a 1:1 salt.

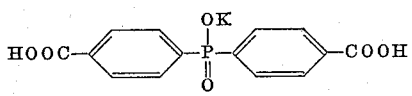

Said salt was mixed with ε-caprolactam at the following ratio and the mixture was melted and polycondensed.

Percent by weight
Salt of diamine of polyethylene oxide _____ 11.0
ε-Caprolactam _____ 89.0

The resultant polymer was mixed with polyethylene terephthalate at a ratio of 1:9, and the mixture was melt spun. As a result, fiber having an excellent antistatic effect was obtained.

Frictionally charged voltage: 980 v.

Example 18

From diamine of polyethylene oxide having a number average molecular weight of 2150 and the following five kinds of dicarboxylic acid, five kinds of salts were prepared.

(I) 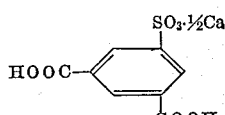

(II) 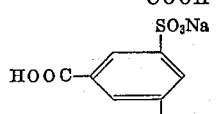

(III) 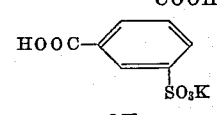

(IV) 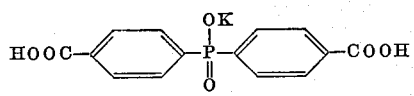

(V) HOOC(CH₂)₄COOH (Control)

From these five kinds of salts and ε-caprolactam, five kinds of polyether-polyamide block copolymers were polymerized. Contents of polyether portions is these polyether-polyamide block copolymers were 10% by weight. The polymerization process was same as in Example 1.

From these five kinds of polyether-polyamide block copolymer and polyethylene terephthalate, side-by-side type composite drawn filaments with a composite ratio of 1:1 by weight were obtained. Results of measuring frictionally charged voltage of these drawn filaments were as follows.

TABLE 13

| Kind of dicarboxylic acid: | Frictionally charged voltage (v.) |
|---|---|
| I | 313 |
| II | 273 |
| III | 285 |
| IV | 225 |
| V (control) | 950 |

As will be apparent from Table 13, antistatic properties of composite filaments obtained from polyether-polyamide block copolymers having ionic groups were remarkably better than that of composite filaments obtained from a polyether-polyamide block copolymer without having an ionic group (upon comparing I–IV with V).

EXAMPLE 19

A salt consisting of equimolar amounts of polyethylene oxide having at its both ends amino groups introduced (at least 95% of the both terminal groups was converted to amino groups, number average molecular weight of 3850) and monosodium 5-sulfoisophthalate was mixed with ε-caprolactam so that content of a polyethylene oxide portion might become 45% by weight. The mixture was heat polymerized at 257° C. for 14 hours in a nitrogen atmosphere. The obtained polyetherpolyamide block polymer was extracted with hot water by the conventional process, thereafter dried.

On the other hand, a salt consisting of equimolar amounts of said diamine of polyethylene oxide and adipic acid was mixed with ε-caprolactam and the mixture was polymerized under the same condition to synthesize a polyether-polyamide block copolymer whose content of a polyethylene oxide portion was 45% by weight.

| Kind of polyether-polyamide block copolymer | Content of a polyethylene oxide portion | Kind of salt of diamine of polyethelene oxide |
|---|---|---|
| A | 45% by weight | Monosodium 5-sulfoisophthalate. |
| B | do | Adipate. |

Using these two kinds of polyether-polyamide block copolymer, the following two kinds of composite filaments were prepared. The spinning temperature was 265–270° C., drawing temperature was 25° C. and drawing ratio was 3.5X.

| Kind of composite filaments | Composite state | First component | Second component |
|---|---|---|---|
| I | Core-sheath type (concentric) composite ratio=1:1. | A 1:9 blend of A and nylon 6. | Nylon 6. |
| II | do | A 1:9 blend of B and nylon 6. | Do. |

Note.—First component was outside (sheath). Second component was inside (core).

The characteristics of the so obtained composite drawn filaments were shown in Table 14.

TABLE 14

| Kind of fiber | Electrostatic characteristics | | Tensile characteristics | | |
|---|---|---|---|---|---|
| | Frictionally charged voltage (V.) | Specific resistance (Ωcm.) | Tenacity (g./d.) | Elongation (percent) | Initial modulus (g./d.) |
| Composite filaments: | | | | | |
| I | 80 | 6.8×10⁶ | 5.8 | 33.5 | 26.5 |
| II | 351 | 6.1×10⁷ | 5.7 | 34.5 | 27.0 |

EXAMPLE 20

Polyethylene oxide dicarboxylic acid (at least 95% of its both ends had been converted to carboxylic groups) having a number average molecular weight of about 3050 was reacted with diamine of the following structure to form a 1:1 salt.

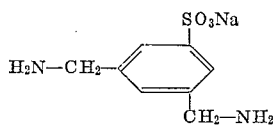

Said salt was so mixed with hexamethylene diammonium adipate that the ratio of a polyethylene oxide portion might become 15% by weight, and the mixture was polycondensed by the conventional process to obtain a polyether-polyamide block copolymer. Composite filaments of a core-sheath type (concentric) whose sheath being said polyether-polymide block copolymer and whose core being a nylon 66 polymer were prepared. The composite ratio was sheath: core=1:4. By such a process, fiber whose antistatic property being very excellent was obtained.

Frictionally charged voltage: 65 v.

EXAMPLE 21

A salt consisting of equimolar amounts of diamine of polyethyleen oxide having a number average molecular weight of about 5150 and potassium 5-sulfoisophthalate was mixed with ε-caprolactam, the mixture being polymerized to synthesize a polyether-polamide block copolymer whose content of a polyethylene oxide portion was 30% by weight (polyether-polyamide block copolymer A).

On the other hand, a salt consisting of equimolar amounts of diamine of polyethylene oxide having a number average molecular weight of about 1000 and adipic acid was mixed with hexamethylene diammonium adipate, the mixture being polymerized to synhtesize a polyether-polyamide block copolymer whose content of a polyethylene oxide was 3% by weight (polyetherpolyamide block copolymer B). Making a blended product of polyether-polyamide block copolymer A with a nylon 6 polymer at a mixing ratio of 1:9 a first component and making polyether-polyamide block copolymer B a second component, a side-by-side type 1:1 composite filament was prepared.

The antistatic property of this filament was very excellent and its effect remained unchanged after being repeatedly washed by an ordinary washing method.

Frictionally charged voltage:

```
                                            Volts
Before washing _____ 150
After 10 washings _____ 180
```

Also said filament had good latent crimpability developing crimps by treatment with boiling water.

EXAMPLE 22

A salt consisting of equimolar amounts of diamine of polyethylene oxide having a number average molecular weight of 2150 and sodium 5-sulfoisophthalate was mixed with ε-caprolactam, the mixture being polymerized to synthesize a polyether-polyamide block copolymer whose content of a polyethylene oxide portion was 60% by weight. Making a blended product of said copolymer with polyethylene terephthalate at a mixing ratio of 1:59 a first component and making polyethylene terephthalate a second component, core-sheath type composite filaments were prepared. The first component was sheath (outside) and the composite ratio was 1:1.

This composite filament had very excellent antistatic property, its effect remaining unchanged after repeated washing by an ordinary washing method.

Frictionally charged voltage:

```
                                            Volts
Before washing _____ 450
After 20 washings _____ 420
```

What is claimed is:

1. An antistatic synthetic resin composition comprising a fiber-forming synthetic resin selected from polyamides, polyesters, polyester-polyamide block copolymers and polyolefins, and a polyoxyalkylene glycol-polyamide block copolymer wherein the polyamide has repeated carbonamide groups as an integral part of the polymeric chain, said block copolymer containing the polyoxyalkylene glycol component in an amount of from 15–85% thereof, the polyoxyalkylene glycol content of said block copolymer based upon the total resin composition being 0.1–20% by weight, said block copolymer containing, as a copolymerization product thereof, an ionic group selected from sulfonic acid, phosphoric acid and metal salts thereof in an amount of from about $2.0 \times 10^{-6}$ to $1.0 \times 10^{-4}$ mol/g. based upon the total resin composition.

2. Antistatic shaped articles obtained by melt-spinning or melt-shaping a synthetic resin composition according to claim 1.

3. Antistatic synthetic fibers obtained by melt-spinning a synthetic resin composition according to claim 1 wherein said polyether-polyamide block copolymer consists of polyethylene oxide segments and polyamide segments having repeating carbonamide groups as an integral part of the polymeric chain.

References Cited

UNITED STATES PATENTS

| 3,190,763 | 6/1965 | Schleede | 106—186 |
| 3,384,681 | 5/1968 | Kobayishi | 260—857 |

SAMUEL H. BLECH, Primary Examiner

P. LIEBERMAN, Assistant Examiner

U.S. Cl. X.R.

260—18, 20, 23, 78